United States Patent [19]

McDonald

[11] 3,735,158

[45] May 22, 1973

[54] THREE TERMINAL BIDIRECTIONAL CONDUCTIVE SWITCHING NETWORK

[75] Inventor: Glen L. McDonald, Seattle, Wash.

[73] Assignee: The Boeing Company, Seattle, Wash.

[22] Filed: June 19, 1972

[21] Appl. No.: 264,096

[52] U.S. Cl. ............307/305, 307/252 B, 307/252 T, 323/24

[51] Int. Cl. ............H03k 17/72

[58] Field of Search ............307/252 B, 252 T, 307/305; 323/24

[56] References Cited

UNITED STATES PATENTS

| | | | |
|---|---|---|---|
| 3,328,606 | 6/1967 | Pinckaers | 307/252 T |
| 3,423,635 | 1/1969 | Moe | 323/24 X |
| 3,509,377 | 4/1970 | Clark et al. | 307/305 X |

*Primary Examiner*—John Zazworsky
*Attorney*—Glenn Orlob and Conrad O. Gardner

[57] ABSTRACT

A three terminal network having first and second load terminals for connection in series circuit relationship with a load across a pair of power supply terminals, and a third gating terminal for controlling alternating current flow in the load. The present three terminal network may be substituted for a triac with corresponding terminal connections to provide triac control functions at greatly increased current levels through the load terminals however with triac level control signals applied to the third gating terminal. The network includes a triac and series connected diodes between the load terminals and a pair of inverse paralleled SCR's in circuit therewith.

7 Claims, 2 Drawing Figures

THREE TERMINAL BIDIRECTIONAL CONDUCTIVE SWITCHING NETWORK

The present invention relates to AC switching circuits and more particularly to bilateral switching arrangements, devices, and networks for controlling application of AC power to a load by application of a control signal to a gating terminal thereof.

The advantage of the triac has been appreciated by skilled circuit designers in that it requires a simple control signal only at the gating terminal and not complicated and expensive trigger circuits for switch control of AC power. On the other hand current ratings of the triac devices are inadequate for high load current applications. The SCR's have high power capability but require complicated trigger circuitry. U.S. Pat. No. 3,486,042 is exemplary of prior art efforts made to connect SCR's back to back or connect triacs in parallel to achieve high power handling capabilities (see column 5).

It is accordingly an object of this invention to provide a three terminal network having current control characteristics of a triac at the gate electrode thereof but current handling characteristics between the load terminals thereof of an SCR.

It is a further object of this invention to provide bidirectional thyristor control of unidirectional thyristors for controlling AC current flow in a load.

It is still another object of this invention to provide a three terminal semiconductor arrangement comprising a plurality of semiconductor elements for bidirectional conduction between the first and second load terminals wherein bidirectional conduction is provided in response to gating signals applied to the third gate terminal.

Other objects of this invention will become apparent from the following description when taken in conjunction with the accompanying drawings in which.

Figure 1:
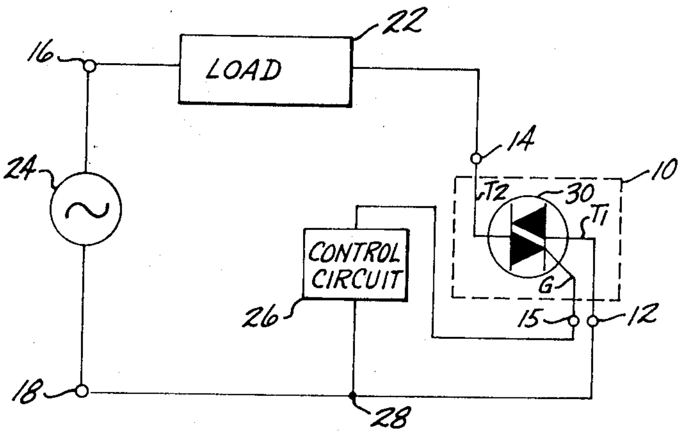
Fig. 1 PRIOR ART
FIG. 1 is a circuit diagram partially in block and partially in schematic form illustrative of prior art triac control of AC power.

Turning now to FIG. 1, there is shown a power control circuit including switching means 10 having three terminals 15, 12 and 14. Load terminals 12 and 14 are connected in series circuit with a load 22 across a pair of power supply terminals 16 and 18, the power supply denoted by the numeral 24. Terminal 15 of three terminal switching means 10 comprises the gate terminal. When a gating pulse provided by control circuit 26 is coupled to gate terminal 15, bidirectional conductivity is provided between load terminals 12 and 14 permitting alternating current from source 24 to flow in opposite directions in load 22. It will be noted from the symbol used within three terminal switching means 10, that the bidirectional conducting device 30 is a three terminal bidirectional thyristor, a triode AC semiconductor device, and more specifically a triac and that the AC power initial circuit is being controlled by this simple unique device in a manner well-known in the art.

The triac 30 can conduct current in either of two directions depending upon the polarity of the potential across its load terminal $T_1$ and $T_2$. Accordingly, if the potential of supply terminal 16 is positive with respect to the terminal 18, triac 30 will conduct current in the direction from terminal 16 to terminal 18. If on the other hand, the potential of terminal 18 is positive with respect to the potential of terminal 16, triac 30 will conduct current in the direction from terminal 18 to terminal 16. The bidirectional conducting triac 30 can be triggered into a conducting state by a low voltage signal level gating signal coupled from a control circuit 26 to its control gate element G. Once it is triggered into conduction, the triac remains conducting until the current flowing through the device is reduced below a known minimum holding current value. This is known as its latching characteristics since it is similar in effect to the latching characteristic of a latching relay. In the absence of a signal applied to gate G, the triac is turned off automatically by the alternating current from source 24 passing through the zero value region. In this region the current through the triac drops below the minimum holding value so that the device would turn off.

The gating pulse developed by control circuit 26 and coupled to gating terminal G utilized to switch triac 30 from high to a low impedance state between its load terminals $T_1$ and $T_2$ may be of either polarity depending upon the polarity state of the source potential 24 applied to load terminals $T_1$ and $T_2$. Further AC control, e.g., properly phased 60 c.p.s. or DC control signals may be utilized in control circuit 26 in a manner well-known in the art to be applied to gating terminal G to cause triac 30 in response thereto exhibit a low impedance characteristic between load terminals $T_1$ and $T_2$.

Figure 2:
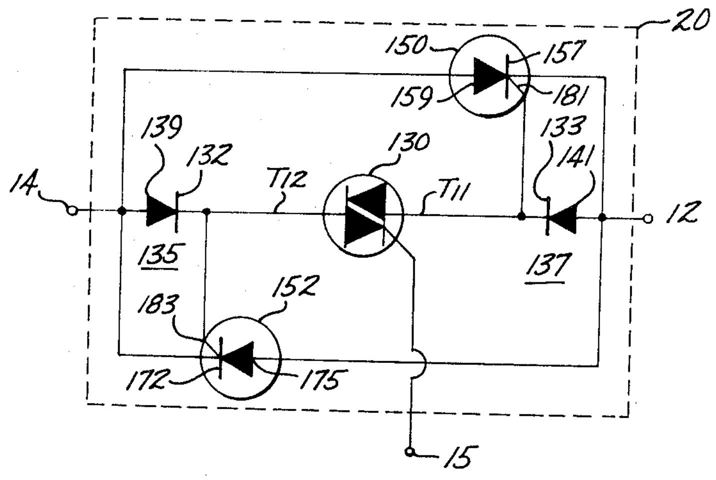
FIG. 2 is a schematic diagram of a three terminal network in accordance with an embodiment of the present invention which may be substituted in the power control circuit of FIG. 1 for the triac to provide control of AC power in loads at higher current levels.

Turning now to FIG. 2 and the following description it will be understood how the three terminal network of FIG. 2 may be utilized as the network of FIG. 1 to provide AC current control between load terminals 14 and 12 in similar manner when similar type control signals are applied to the third gating terminal 15 thereof however not limited to the AC currents as FIG. 1 where the three terminal network comprises a single active device, viz., triac 30.

In FIG. 2 a triac 130 is coupled with load terminals $T_{11}$ and $T_{12}$ thereof in series with load terminals 14 and 12 of the three terminal network 20. The cathodes 132 and 133 of diodes 135 and 137 are connected respectively to load terminals $T_{11}$ and $T_{12}$ while the anodes 139 and 141 of diodes 135 and 137 are connected respectively to load terminals 14 and 12 to form the series circuit. This series circuit which includes triac 130 is operatively connected to provide unilateral conduction of current in opposite directions through each of two parallel paths coupled between load terminals 14 and 12 which include thyristors 150 and 152 respectively disposed individually in each of said two parallel paths. First thyristor 150 has the cathode 157 connected to load terminal 12 and anode 159 connected to load terminal 14, while thyristor 152 has the cathode 172 connected to load terminal 14 and anode terminal 175 connected to load terminal 12. Gate terminal 181 of thyristor 150 is connected to load terminal $T_{11}$ of triac 130 while gate terminal 183 of triac 152 is connected to load terminal $T_{12}$ of triac 130. The preceding three terminal network 20 functions as three terminal network 10 of FIG. 1 since triac 130 is utilized as the control element to provide bilateral conduction between load terminals 14 and 12 through control of the parallel circuit paths comprising thyristors 150 and 152, triac 130 providing gate drive for the thyristors. Diodes 135 and 137 connected as shown and described limit the peak reverse voltage across gate and cathode of the thyristors to about 0.6 volts for silicon type diodes and about 0.2 volts for germanium types. With no control signal applied to gate terminal of the three terminal network 20, triac 130 remains nonconductive and there is no bilateral conduction between load terminals 14 and 12 since there is no current flow and gate electrodes 181 and 183 are not energized. However, upon application of a control signal to gate terminal 15, and upon occurrence of positive polarity AC at terminal 12, a series path for current flow is provided by diode 137, triac 130, and gate 183 of SCR 152 with diode 135 blocking current flow and providing the aforementioned current conduction through gate 183. Current flow through gate 183 fires SCR 152 into a low impedance conducting state to provide a parallel conducting path for current flow from load terminal 12 to load current terminal 14 to handle large currents characteristic of the current handling capabilities of an SCR. This conduction by SCR 152 causes triac 130 to return to its nonconducting state and the parallel path including SCR 152 conducts during the remainder of the positive half cycle, nonblocking diode 135 maintaining the peak reverse gate voltage of SCR 152 well below its maximum value. Load current is conducted in the reverse direction from load terminal 14 to load terminal 12 through conduction of SCR 150 in the other parallel path when control signals are applied to gating terminal 15 turning triac 130 into its conducting state so that series path including diode 135, triac 130 and gate terminal 181 of SCR 150 is completed from load terminal 14. In this manner SCR 150 conducts current as did SCR 152 however for the remaining half wave portion of the AC and in the opposite direction, viz., from load terminal 14 to load terminal 12. Nonblocking diode 135 in this case protects SCR 192 as diode 137 protects SCR 150. The circuit of FIG. 2 can thus be seen to work in a manner similar to the three terminal network of FIG. 1 utilizing a single triac but without the recognized triac power limitations and being limited only by SCR power handling capability. Three terminal network 10 may be considered the equivalent circuit of three terminal network 20 however with high power handling capabilities.

Since the triac 130 and diodes 150 and 152 are required to conduct only small currents for relatively short time periods, e.g., a few microseconds, triacs currently commercially available have adequate current handling capabilities for use in the circuit of FIG. 2 while many diodes may also be selected by those skilled in the art desiring to practice the present invention.

The following component selections for utilization in the circuit of FIG. 2 should be considered merely as exemplary of improved current handling capabilities of the circuit of FIG. 2.

EXAMPLE 1

Components selected for 117 volt application that will improve triac control current handling capabilities over the three terminal network of FIG. 1 by about 88 percent:

| | |
|---|---|
| Diodes 135, 137 | Motorola type HEP 156 |
| SCR 150, 152 | Motorola type 306 or 307, or both uninsulated on heat sink |
| Triac 130 | Motorola type 340 |

EXAMPLE 2

Components selected for 117 volt 1000 ampere operation at 180° conduction angle:

| | |
|---|---|
| Diodes 135, 137 | General Electric type DT230B |
| SCR 150, 152 | General Electric type C520B |
| Triac 130 | General Electric type SC240B which is a six ampere triac well above the 200 milliampere requirement of a few microseconds |

What is claimed is:

1. In combination in a power control circuit including a source of AC power and a load:
bidirectional switching means normally exhibiting a high impedance characteristic between first and second current carrying terminals thereof and exhibiting a low impedance characteristic in response to the application of a control signal to a third gating terminal thereof and the application of opposite polarity voltages to the first and second current carrying terminals thereof, said first and second current carrying terminals connected in series circuit with said load and source of AC power; said bidirectional switching means including,
a bidirectional thyristor having fourth and fifth current carrying terminals and a sixth gating terminal, said fourth and fifth current carrying terminals coupled respectively to said first and second current carrying terminals, and said sixth gating terminal coupled to said third gating terminal,
a first unidirectional thyristor having seventh and eighth current carrying terminals and a ninth gating terminal said seventh and eighth current carrying terminals coupled respectively to said first and second current carrying terminals for conducting current in a predetermined direction between said first and second current carrying terminals and said ninth gating terminal coupled to said fifth current carrying terminal,
a second unidirectional thyristor having tenth and eleventh current carrying terminals and a twelfth gating terminal, said tenth and eleventh current carrying terminals coupled respectively to said first and second current carrying terminals for conducting current in a direction opposite to said predetermined direction between said first and second current carrying terminals.

2. A control circuit for controlling AC current flow between first and second terminals in response to control signals applied to a third terminal comprising in combination:
a first series circuit path comprising a triac and first and second diodes connected between said first and second terminals, the anodes of each of said first and second diodes individually connected respectively to said first and second terminals and the cathodes of said first and second diodes each individually connected respectively to the load terminals of said triac;
a first SCR having an anode, cathode and gate electrode, said anode connected to said first terminal, said cathode connected to said second terminal and said gate electrode connected to the cathode of said second diode;
a second SCR having an anode, cathode and gate electrode, said anode connected to said second terminal, said cathode connected to said first terminal, and said gate electrode connected to the cathode of said first diode; and means for coupling the gate electrode of said triac to said third terminal.

3. A power circuit comprising in combination:

an AC current source;

a load;

a first diode having a cathode and an anode;

a triac having first and second load terminals and a gate electrode;

a second diode having a cathode and an anode;

said cathode of said first diode connected to said first load terminal of said triac, said cathode of said second diode connected to said second load terminal of said triac, said anode of said first diode and said anode of said second diode connected in series circuit relationship with said AC current source and said load;

a first silicon controlled rectifier having an anode, cathode, and gate electrode, said anode connected to the anode of said first diode, said cathode connected to the anode of said second diode, and said gate electrode connected to the cathode of said second diode;

a second silicon controlled rectifier having an anode, cathode, and gate electrode, said anode connected to the anode of said second diode, said cathode connected to the anode of said first diode, and said gate electrode connected to the cathode of said first diode; and, control circuit means coupled to the gate electrode of said triac for applying gating signals to said gate electrode.

4. A triac controlled SCR circuit for controlling current flow between first and second terminals comprising in combination:

a first unidirectional thyristor coupled between said first and second terminals for providing current flow in a first direction between said first and second terminals;

a second unidirectional thyristor coupled between said first and second terminals for providing current flow in a second direction opposite to said first direction between said first and second terminals;

a triac having first and second load terminals coupled to the gate electrodes of said first and second unidirectional thyristors respectively for providing gate drive for said unidirectional thyristors in response to gating signals applied to the gate electrode of said triac.

5. The invention according to claim 4 further comprising means for limiting the peak reverse voltage across gate and cathode of said unidirectional thyristors.

6. A triac controlled SCR circuit for controlling AC current flow between first and second terminals comprising in combination:

a first unidirectional thyristor coupled between said first and second terminals for providing current flow in a first direction between said first and second terminals;

a second unidirectional thyristor coupled between said first and second terminals for providing current flow in a second direction opposite to said first direction between said first and second terminals;

a triac having first and second load terminals coupled to the gate electrodes of said first and second unidirectional thyristors respectively and providing said AC current flow during a predetermined time period in response to gating signals applied to the gate electrode of said triac, said first and second unidirectional thyristors providing said AC current flow after said predetermined time period.

7. The invention according to claim 6 wherein said predetermined time period is substantially equal to the turn time of said unidirectional thyristors.

* * * * *